Aug. 27, 1935.    M. YAMAKI    2,012,649
RUBBER HEEL
Filed June 8, 1934

Inventor
Masuji Yamaki
By E. F. Wendiroth
Attorney

Patented Aug. 27, 1935

2,012,649

UNITED STATES PATENT OFFICE 2,012,649

RUBBER HEEL

Masuji Yamaki, Sanno, Omori-ku, Tokyo-shi, Japan

Application June 8, 1934, Serial No. 729,717
In Japan June 6, 1933

1 Claim. (Cl. 36—35)

This invention relates to a heel rubber and more particularly a heel rubber which is durable and preventive of slipping.

The main object of this invention is to provide heel rubbers which are considerably durable and slip-preventive. The other object is to provide heel rubbers of such kind in a simple manner and at a small cost.

Heretofore, several attempts have been tried to improve heel rubber to make them durable and non-slipping on the wet road or pavement. For instance, vulcanized rubber or metal pieces have been embedded in a part of the ordinary heel rubber for these purposes but all such attempts have been proved impractical and ineffective because they give the wearers unpleasant shocks. In such a heel rubber material embedded therein having a different elasticity from that of the rubber gives shock directly and, being imperfect in cohesion with said rubber body, will readily part from said rubber and come off.

In order to remove such defects and to provide heel rubbers of the kind above described, I have embedded a coil of some hard metal wire as resilient as the rubber body underneath the rear rim of the heel rubber, forming said coil into an arcuate shape, that is, in the configuration of the rear portion of the heel.

Figure 1:
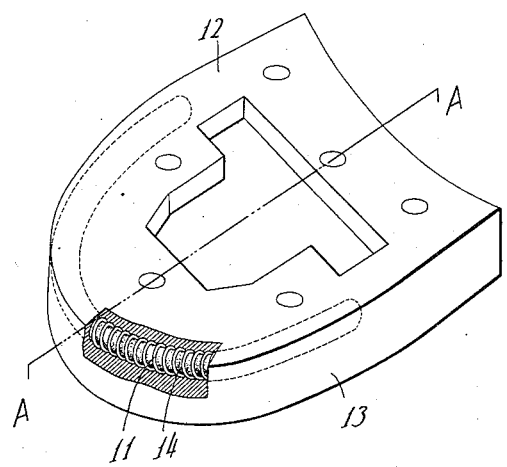
Figure 2:
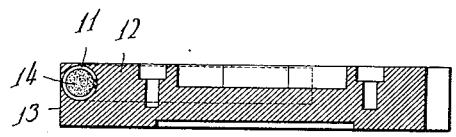

Now, a further description of the invention will be given in the following lines referring to the accompanying drawing, in which:

Figure 1 shows an example of heel rubber embodying this invention, showing a perspective view thereof with a part broken off, and Figure 2 is a side sectional view of the same along the line A—A in Fig. 1.

The heel rubber embodying this invention comprises a coil of hard metal wire such as steel (piano wire) wound spirally and embedded in arcuate form along the rear portion or more, extending, if desired, to other parts of the rubber body. More particularly speaking, the said coil is so embedded in the rubber that it runs closely with the side surface 13 and the heel surface 12 which comes in contact with the ground.

Being thus constructed, the heel rubber of this invention does not wear out so soon as an ordinary one heretofore used and practically prevents slipping on the wet road. Moreover, the heel rubber according to this invention being sufficiently resilient, it does not give any hard shock to the wearer. In fact it takes equal resiliency with the rubber and its consolidation with the rubber is extremely tight. Accordingly the coil does not part from the rubber, being firmly arrested by the rubber, and even if a part thereof be worn out the remaining portions are still adhering to the rubber and act still their roles.

In order to increase the durability of the heel rubber it is preferable to put hard material 14 such as silica grains with binder in the hollow space or core of the coil. For this purpose the heel rubber of this invention is extremely convenient and effective as said silica grains mingled with binder can occupy the hollow space or core of the coil 11 and be gripped firmly by the coil resulting in being prevented from coming off easily.

What I claim is:

A heel rubber comprising a coil of some hard metal wire, the core of said coil being filled with rough crystals of silica or similar material mingled with binder, said coil being embedded in and along the rear portion of the rubber body and closely underneath the heel surface which comes in contact with the ground.

MASUJI YAMAKI.